United States Patent
Naruse et al.

(10) Patent No.: US 11,746,017 B2
(45) Date of Patent: *Sep. 5, 2023

(54) CARBON NANOTUBE AGGREGATE

(71) Applicant: DENSO CORPORATION, Kariya (JP)

(72) Inventors: Jyunichi Naruse, Kariya (JP); Arisa Inoue, Kariya (JP); Takanori Yokoi, Kariya (JP); Katsuma Ishino, Kariya (JP)

(73) Assignee: DENSO CORPORATION, Kariya (JP)

( * ) Notice: Subject to any disclaimer, the term of this patent is extended or adjusted under 35 U.S.C. 154(b) by 98 days.

This patent is subject to a terminal disclaimer.

(21) Appl. No.: 17/388,246

(22) Filed: Jul. 29, 2021

(65) Prior Publication Data

US 2022/0033264 A1 Feb. 3, 2022

(30) Foreign Application Priority Data

Jul. 31, 2020 (JP) .................. 2020-130987
Jul. 27, 2021 (JP) .................. 2021-122196

(51) Int. Cl.
C01B 32/168 (2017.01)
B82Y 40/00 (2011.01)
B82Y 30/00 (2011.01)

(52) U.S. Cl.
CPC ............ *C01B 32/168* (2017.08); *B82Y 30/00* (2013.01); *B82Y 40/00* (2013.01);
(Continued)

(58) Field of Classification Search
CPC ............ C01B 32/168; C01B 2202/20; C01B 2202/10; C01B 32/178; C01B 32/158;
(Continued)

(56) References Cited

FOREIGN PATENT DOCUMENTS

JP 2007-070155 A 3/2007
WO 2018/147126 A1 8/2018

OTHER PUBLICATIONS

Mittal, et al., Photolysis-Driven, Room Temperature Filling of Single-Wall Carbon Nanotubes, Journal of Nanoscience and Nanotechnology 2019; 19: 4129-4135 (Year: 2019).*

(Continued)

*Primary Examiner* — Daniel C. McCracken
(74) *Attorney, Agent, or Firm* — POSZ LAW GROUP, PLC

(57) ABSTRACT

A carbon nanotube aggregate includes a plurality of carbon nanotubes, a metal compound, and an oxide of the metal compound. The metal compound is contained in a space inside of each of the carbon nanotubes and/or in a space defined between the plurality of carbon nanotubes. When the metal compound is added inside the carbon nanotube aggregate, the metal compound is oxidized by reacting with oxygen or the like during or after a production process of the CNT aggregate, and the oxide is formed in the opening of the space to which the metal compound is added, so that the metal compound is capped with the oxide. Since the metal compound inside the CNT aggregate is shielded from the atmosphere, separation of the metal compound and reaction between the metal compound and oxygen and water in the atmosphere are suppressed, increasing heat resistance of the carbon nanotube aggregate.

6 Claims, 15 Drawing Sheets

(52) U.S. Cl.
CPC ...... *C01B 2202/20* (2013.01); *C01P 2004/13* (2013.01); *C01P 2004/50* (2013.01); *C01P 2004/64* (2013.01); *C01P 2004/80* (2013.01); *C01P 2006/10* (2013.01)

(58) Field of Classification Search
CPC ..... C01B 32/159; C01B 32/16; C01B 32/162; C01B 32/164; C01B 32/166; C01B 32/17; C01B 32/172; C01B 32/174; C01B 32/176; C01B 2202/00; C01B 2202/02; C01B 2202/04; C01B 2202/06; C01B 2202/08; C01B 2202/22; C01B 2202/24; C01B 2202/26; C01B 2202/28; C01B 2202/30; C01B 2202/32; C01B 2202/34; C01B 2202/36; B82Y 30/00; B82Y 40/00; C01P 2004/13; C01P 2004/50; C01P 2004/64; C01P 2004/80; C01P 2006/10; C01P 2004/61; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

OTHER PUBLICATIONS

Monthioux, et al., Hybrid carbon nanotubes: Strategy, progress, and perspectives, J. Mater. Res. 2006; 21: 2774-2793 (Year: 2006).*
Cargnello, et al., Multiwalled Carbon Nanotubes Drive the Activity of Metal@oxide Core-Shell Catalysts in Modular Nanocomposites, J. Am. Chem. Soc. 2012; 134: 11760-11766 (Year: 2012).*
Kim et al., "Role of Anions in the AuCl3-Doping of Carbon Nanotubes", American Chemical Society, Published online Jan. 5, 201110.1021/nn1028532, vol. 5 No. 2, pp. 1236-1242, www.acsnano.org.
Tonkikh et al., "Films of filled single-wall carbon nanotubes as a new materialfor high-performance air-sustainable transparent conductive electrodesoperating in a wide spectral range", View Article Online, The Royal Society of Chemistry 2019, Nanoscale, 2019, 11, pp. 6755-6765.
HMiyazaki et al., "MoCl5 intercalation doping and oxygen passivation of submicrometer-sized multilayer graphene", 2017 Jpn. J. Appl. Phys. 5604CP02.
U.S. Appl. No. 17/388,224, filed Jul. 29, 2021, Naruse et al.

* cited by examiner

G BAND PEAK POSITION (cm$^{-1}$)

| SAMPLE | BEFORE HEATING TEST | AFTER HEATING TEST |
|---|---|---|
| C-1 | 1593 | — |
| C-2 | 1601 | 1596 |
| C-3 | 1609 | 1609 |

CARBON NANOTUBE AGGREGATE

CROSS REFERENCE TO RELATED APPLICATION

The present application claims the benefit of priority from Japanese Patent Application No. 2020-130987 filed on Jul. 31, 2020 and Japanese Patent Application No. 2021-122196 filed on Jul. 27, 2021. The entire disclosures of the above application are incorporated herein by reference.

TECHNICAL FIELD

The present disclosure relates to an aggregate of carbon nanotubes (hereinafter referred to as CNT).

BACKGROUND

A CNT aggregate made of a plurality of CNTs is expected to be applied to conductive films and windings. In recent years, there is a demand for lowering electrical resistance due to miniaturization of devices. As a method for lowering the electrical resistance, it is known to conduct a doping treatment to dope CNTs with $AuCl_3$, for example, as disclosed in Non-Patent Literature 1.

Non-Patent Literature 1: Kim et al., Role of Anions in the $AuCl_3$-Doping of Carbon Nanotubes, ACS NANO 2011, vol. 5, No. 2, 1236-1242

SUMMARY

The present disclosure describes a CNT aggregate having a high heat resistance. The CNT aggregate includes a plurality of carbon nanotubes, a metal compound, and an oxide of the metal compound. The metal compound is contained in a space inside of each of the carbon nanotubes and/or in a space defined between the plurality of carbon nanotubes.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Figure 1:
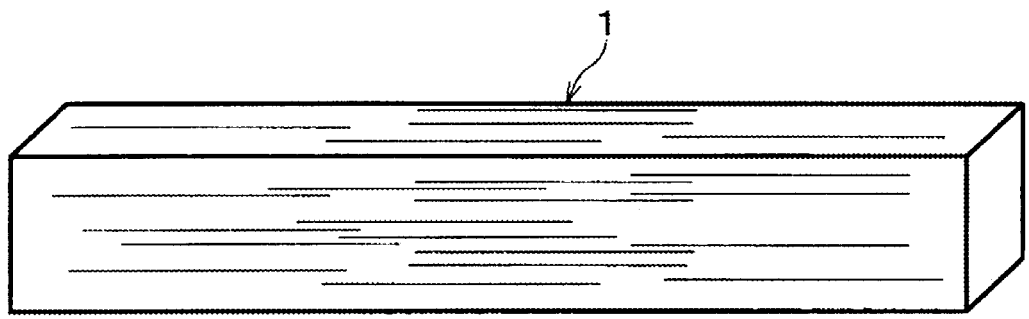
FIG. 1 is a diagram showing an external view of a CNT aggregate according to a first embodiment.

In addition to the lowering of the electrical resistance, CNT aggregates are required to cope with high temperature environments such as for vehicle motors. For example, even if the CNT aggregates are left in the atmosphere of at least 200° C. or higher for 100 hours or longer, it is required that the resistance change is small and the electrical resistance is maintained. However, in a conventional method, such as in a method of Patent Literature 1, although the effect of lowering the electrical resistance is maintained at a temperature of about 100° C., the effect of lowering the electrical resistance is degraded at a temperature of 200° C. or higher. This is considered because of deterioration due to the release of dopant or the reaction with oxygen and water in the atmosphere.

Further, for n-type CNT materials for thermoelectric materials, a technique of adding an alkali element such as lithium or potassium or a composite of potassium ion and crown ether to the inside of the CNT has been proposed. However, the stability at 200° C. or higher in the atmosphere has not been confirmed. Further, there are few cases in which a p-type dopant, which is more stable in the atmosphere than the n-type dopant, is added to the inside of the CNT. Also, there is no case that exhibits the heat resistance for 100 hours or longer in the atmosphere of 200° C. or higher.

The present disclosure provides a high heat resistance CNT aggregate.

According to an aspect of the present disclosure, a CNT aggregate includes a plurality of CNTs, a metal compound and an oxide of the metal compound. The metal compound is contained in the space inside each of the CNTs and/or in the space surrounded by the CNTs.

In such a configuration, since the metal compound is added to the inside of the CNT aggregate, the metal compound is oxidized by reacting with oxygen or the like during or after a production process of the CNT aggregate, and the oxide is formed in the opening of the space to which the metal compound is added, so that the metal compound is capped with the oxide. Therefore, the metal compound inside the CNT aggregate is shielded from the atmosphere. As a result, the separation of the metal compound and the reaction between the metal compound and oxygen and water in the atmosphere are suppressed, and the heat resistance of the CNT aggregate is improved.

The following describes several embodiments of the present disclosure with reference to the drawings. In the following embodiments, the same or equivalent parts are denoted by the same reference numerals as each other, and the descriptions there of will not be repeated.

First Embodiment

Figure 2:
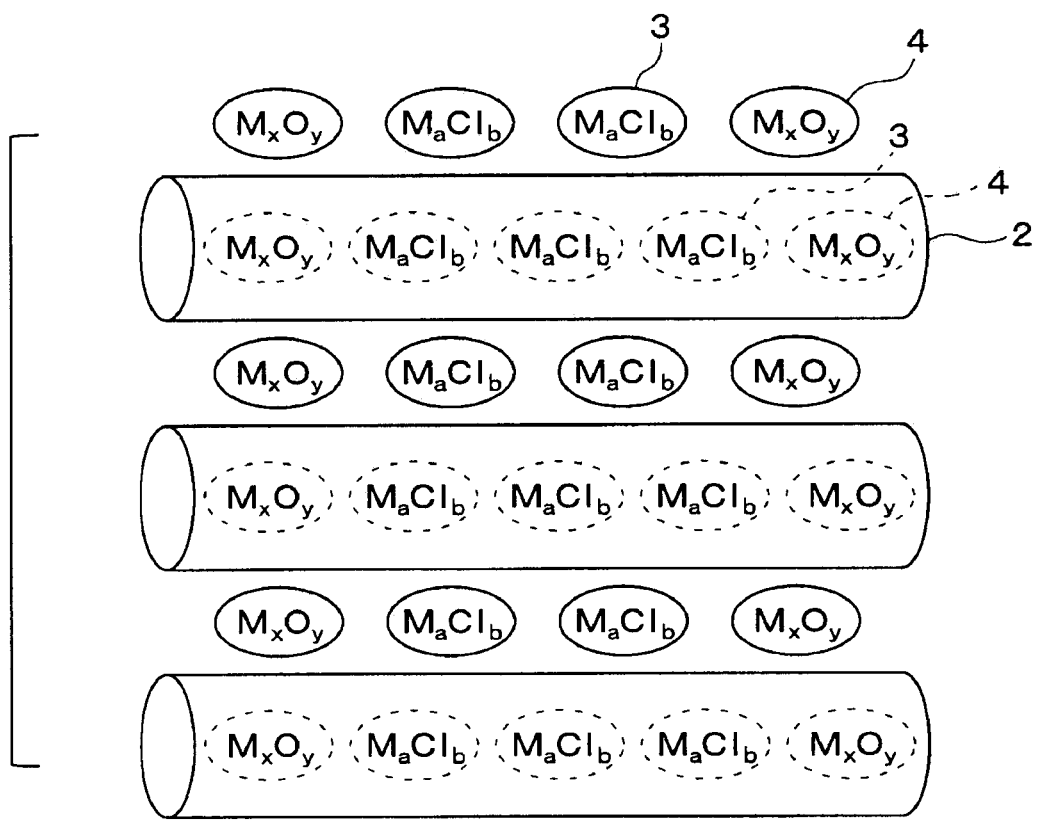
FIG. 2 is a diagram showing an internal configuration of the CNT aggregate.

A first embodiment will be described. A CNT aggregate 1 of the present embodiment is formed by aggregating a plurality of CNTs 2 to have a rod-shaped or tape-shaped structure as shown in FIG. 1 and FIG. 2. The CNT aggregate 1 is used, for example, in CNT conductive films, CNT windings for devices, CNT windings for motors, CNT wire harnesses, and the like. The length of one side of the CNT aggregate 1 is, for example, 10 μm or more. In a case where the CNT aggregate 1 has a quadrangular pillar shape having a quadrangle in a cross-section, the length of one side of the quadrangle is, for example, 10 μm or more. In a case where the CNT aggregate 1 has a columnar shape, the diameter of the CNT aggregate 1 is, for example, 10 μm or more. The average inner diameter of the plurality of CNTs 2 is, for example, 0.55 nm or more and 1000 nm or less.

As shown in FIG. 2, the CNT aggregate 1 contains a metal compound 3 and an oxide 4 of the metal compound 3. The metal compound 3 is for lowering the electrical resistance of the CNT aggregate 1, and is contained in a space inside each of the CNTs 2 and spaces outside the CNTs 2 and surrounded by the plurality of CNTs 2. The spaces defined outside and surrounded by or between the CNTs 2 will be referred to as inter-CNT spaces. The metal compound 3 is provided by, for example, molybdenum chloride ($MoCl_5$) or iron chloride ($FeCl_3$). In FIG. 2, the CNTs 2 having a columnar shape are shown for the sake of simplicity. Further, the metal compound 3 added to the inside of the CNT 2 is shown by a broken line, and the metal compound 3 added to the outside of the CNT 2 is shown by a solid line.

The metal compound 3 is capped with the oxide 4. Specifically, as shown in FIG. 2, openings of the CNTs 2 and openings of the inter-CNT spaces are capped with the oxide 4. In a case where the metal compound 3 is made of $MoCl_5$, the oxide 4 is made of molybdenum oxide (e.g., $MoO_3$, $MoO_2$) or molybdenum chloride partial oxide ($MoO_xCl_{5-x}$, e.g., $0.1 \leq x \leq 3$).

Such a CNT aggregate 1 is produced, for example, by the following procedure. First, a CNT film of DexMat INC. (USA) is placed in a vacuum and heated at 300° C. to 350° C. to remove moisture inside of the CNT. Next, after mixing the CNT film and $MoCl_5$ gas in an Ar atmosphere in which $O_2$ is 1 ppm to 20 ppm, the CNT film is sealed in a container to be shielded from the atmosphere and heated at 260° C. to 350° C. Then, $MoCl_5$ on the surface of the CNT film is removed by washing with ethanol.

In this way, the CNT aggregate 1 in which $MoCl_5$ is added as the metal compound 3 to the inside of the CNTs 2 and the inter-CNT spaces defined between the CNTs 2, and the openings of the CNTs 2 and the openings of the inter-CNT spaces between the adjacent CNTs 2 are capped with, as the oxide 4, $MoO_3$, $MoO_2$ or $MoO_xCl_{5-x}$ is produced. If the temperature to heat the CNT film in vacuum is 500° C. or higher, the openings of the CNTs 2 and the openings of the inter-CNT spaces between the CNTs 2 are capped with $MoO_3$ or the like, and an oxide film (not shown) is formed on the surface of the CNT aggregate 1 as the oxide 4. The oxide film entirely covers the CNT aggregate 1. This oxide film is made of $MoO_3$, $MoO_2$ or $MoO_xCl_{5-x}$. Also in a case where $FeCl_3$ is added as the metal compound 3, the CNT aggregate 1 can be produced in the same manner.

Figure 3:
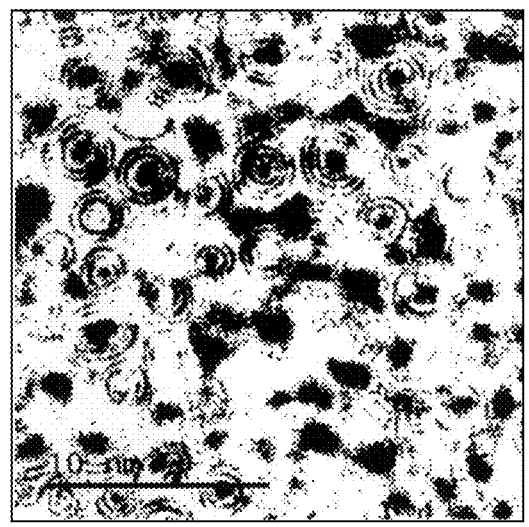
FIG. 3 is a photomicrograph showing the presence of molybdenum-based particles inside CNTs.
Figure 4:
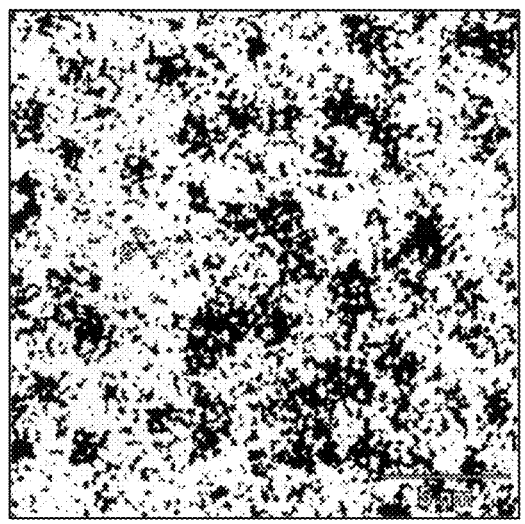
FIG. 4 is a photomicrograph showing the distribution of molybdenum.
Figure 5:
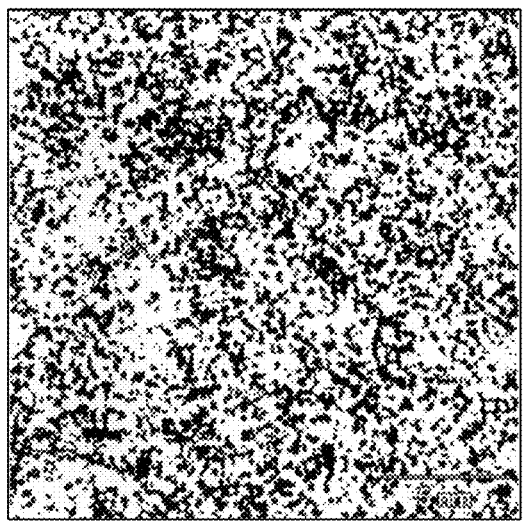
FIG. 5 is a photomicrograph showing the distribution of chlorine.
Figure 6:
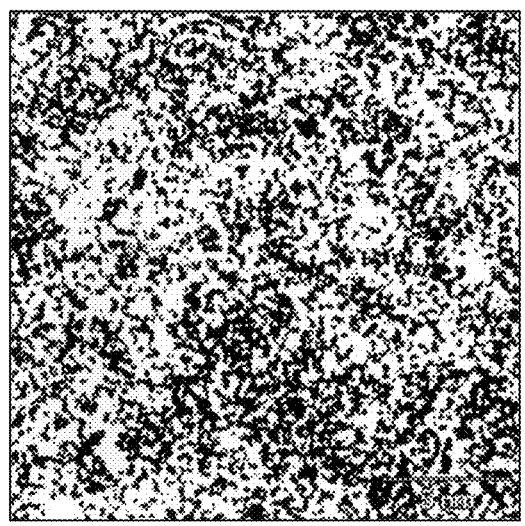
FIG. 6 is a photomicrograph showing the distribution of oxygen.
Figure 7:
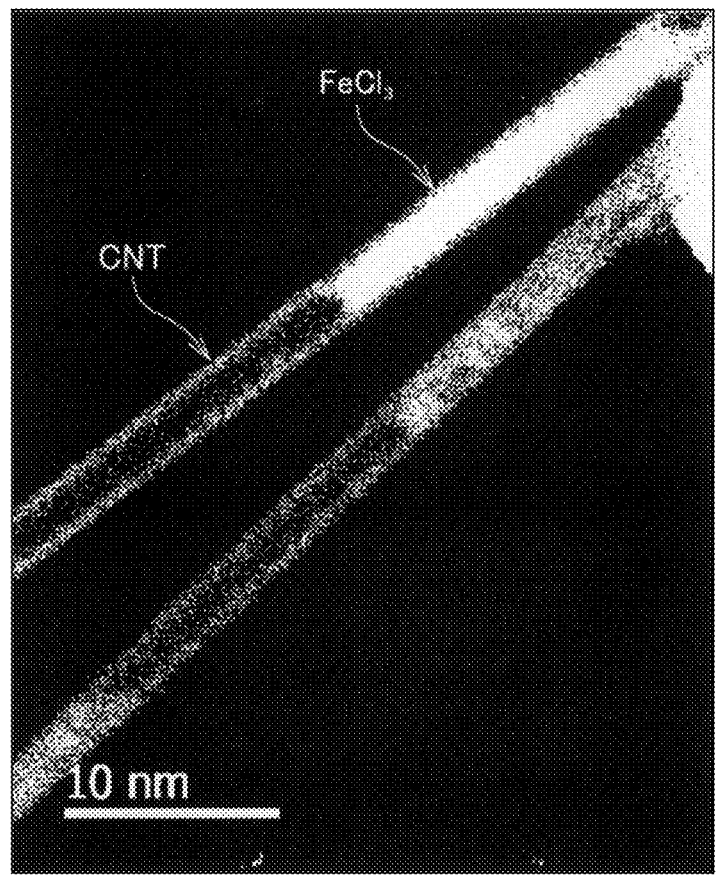
FIG. 7 is a photomicrograph showing the presence of iron chloride inside CNT.

FIGS. 3 to 6 are scanning transmission electron micrographs of a cross section of the CNT aggregate 1 produced by the method described above, and show distributions of molybdenum, oxygen, and chlorine inside the CNT aggregate 1. In FIG. 3, black circles are the CNTs 2, and other black areas are molybdenum-based particles. In FIGS. 4 to 6, the contents of molybdenum, chlorine, and oxygen are higher in the black areas than in the white areas.

As shown in FIGS. 3 to 6, the molybdenum-based particles are contained inside the CNTs 2 and in the inter-CNT spaces defined between the CNTs 2. Further, chlorine and oxygen are distributed entirely inside of the CNT aggregate 1, but oxygen shows a distribution closer to that of molybdenum than that of chlorine. Accordingly, it is appreciated that, at the openings of CNTs 2, the content of chlorine is reduced and caps mainly composed of molybdenum and oxygen are formed. The compound ratio in the CNT aggregate 1 examined by an X-ray absorption fine structure measurement (XAFS) was $MoCl_5:MoO_3:MoO_2=78.4:14.5:7.1$.

Figure 8:
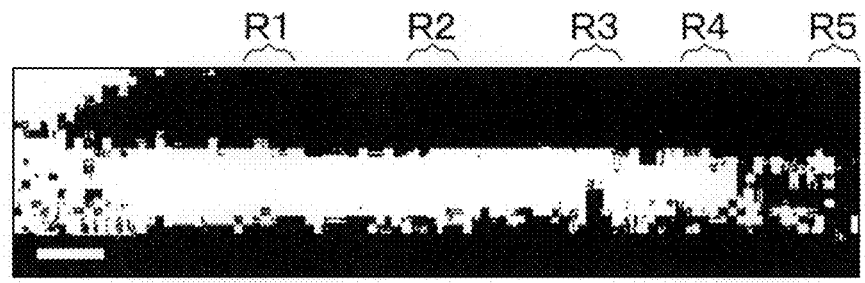
FIG. 8 is a diagram showing an enlarged view of a portion, to which iron chloride is added, in FIG. 7.
Figure 9:
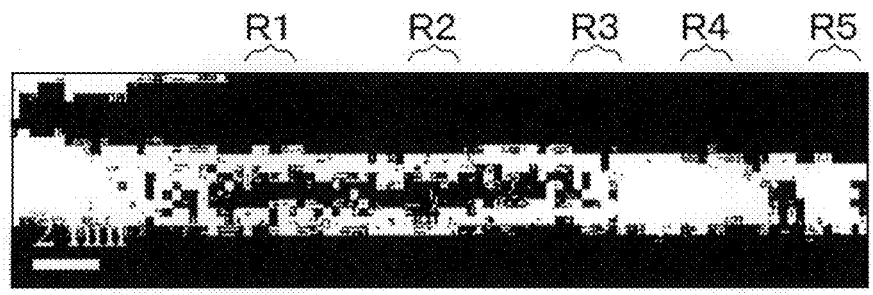
FIG. 9 is a photomicrograph showing the distribution of carbon.
Figure 10:
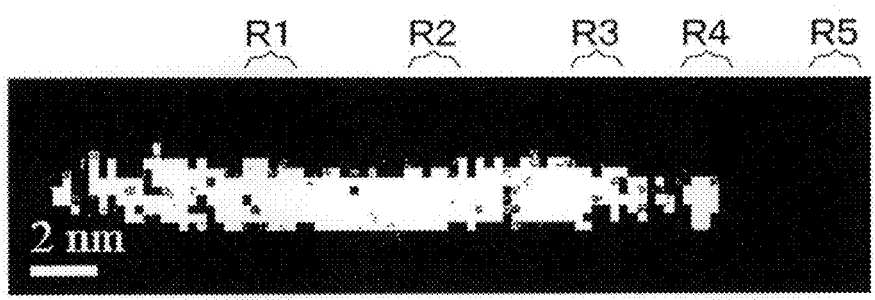
FIG. 10 is a photomicrograph showing the distribution of chlorine.
Figure 11:
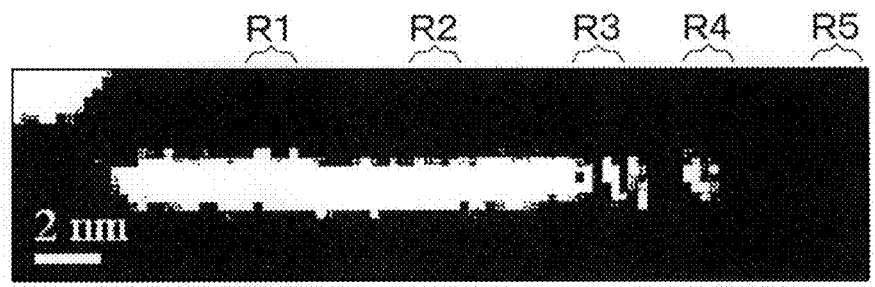
FIG. 11 is a photomicrograph showing the distribution of iron.

FIGS. 7 to 11 are scanning transmission electron micrographs of a CNT aggregate 1 to which $FeCl_3$ is added as the metal compound 3, and the CNTs 2 inside of which $FeCl_3$ is added is photographed from the side surface. FIG. 8 is an enlarged view of a portion of FIG. 7 to which $FeCl_3$ is added, and FIGS. 9 to 11 are diagrams showing the distribution of carbon, chlorine, and iron in the portion shown in FIG. 8, respectively. In FIGS. 8 to 11, regions R1 and R2 are the inside of the portion to which $FeCl_3$ is added, regions R3 and R4 are ends of the portion to which $FeCl_3$ is added, and region R5 is outside of the portion to which $FeCl_3$ is added.

Figure 12:
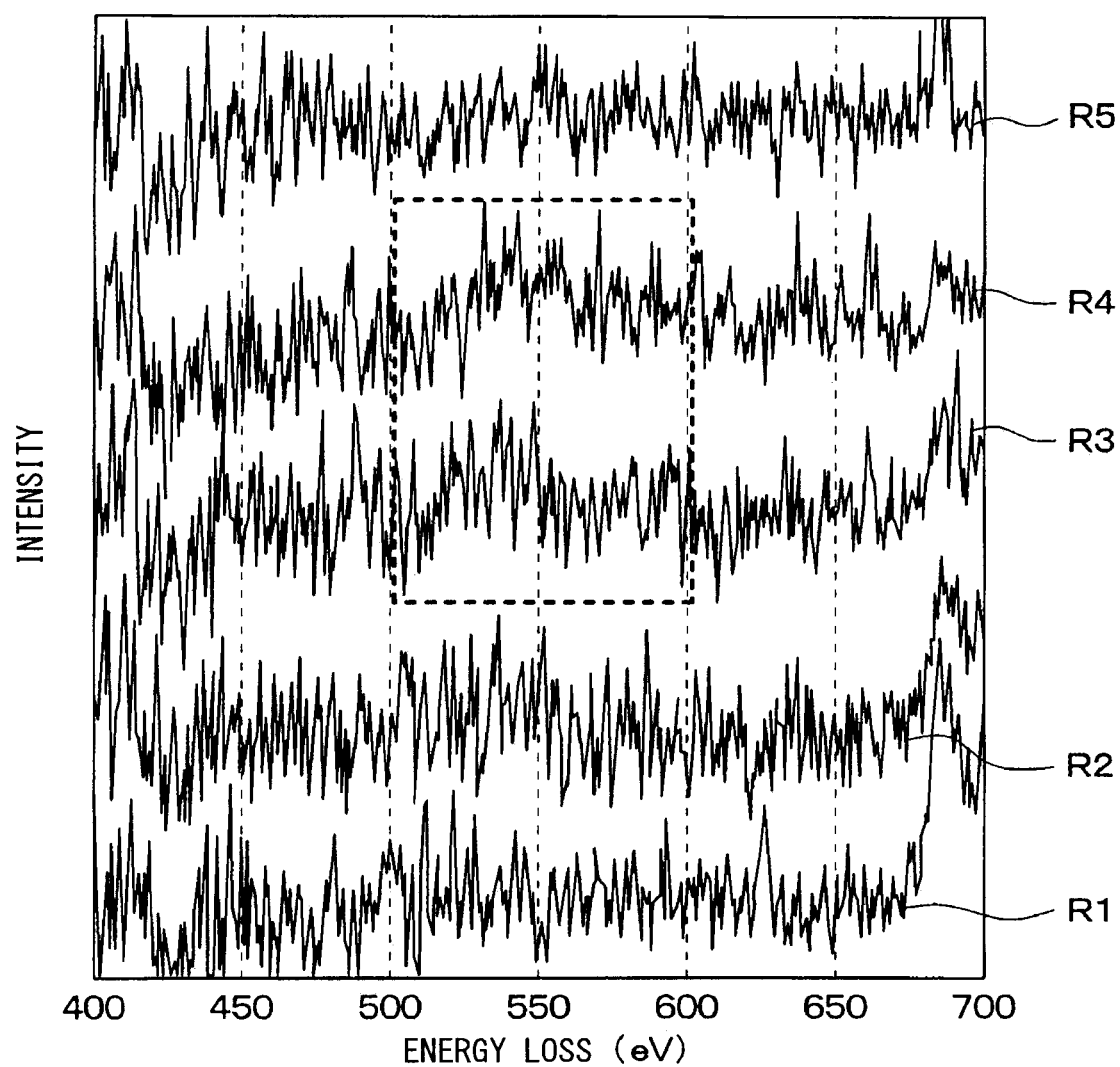
FIG. 12 is a diagram showing detection results of oxygen.
Figure 13:
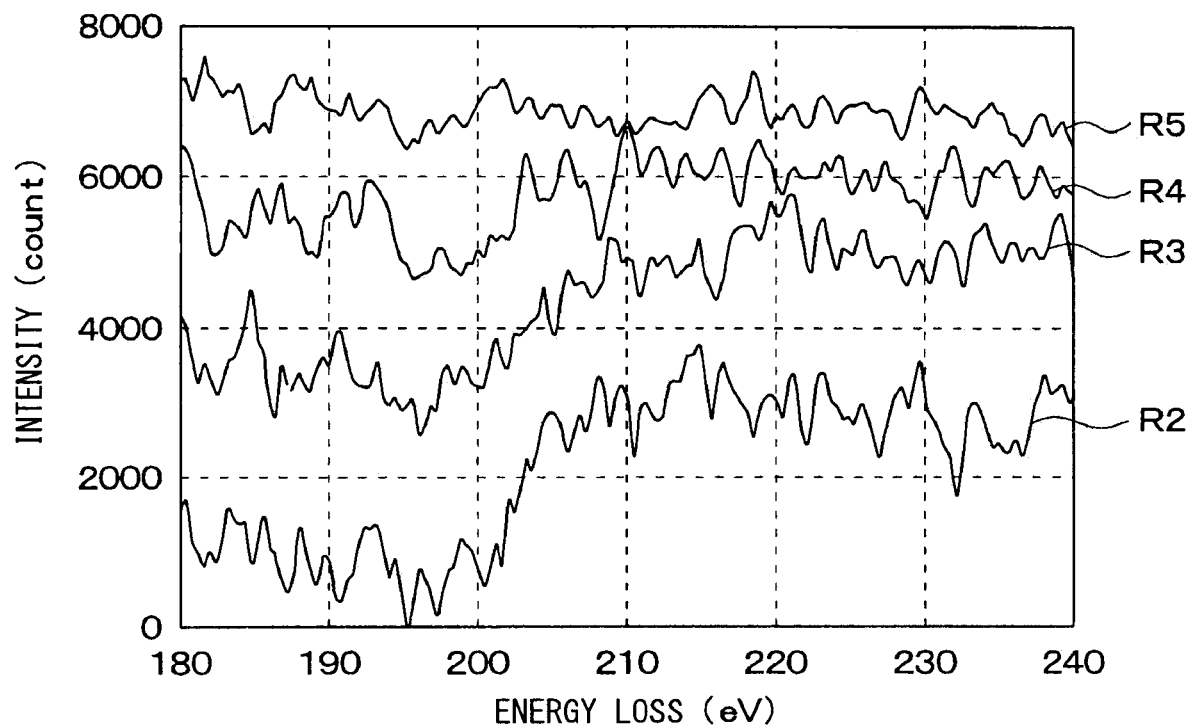
FIG. 13 is a diagram showing detection result of chlorine.

FIG. 12 shows the results of detection of oxygen from the regions R1 to R5 by an electron energy loss spectroscopy (EELS) analysis. In FIG. 12, the peak of the intensity in the range of energy loss of 500 eV to 600 eV indicates that oxygen is contained in that region. FIG. 13 shows the result of detection of chlorine from the regions R2 to R5 by the EELS analysis. In FIG. 13, the increase in intensity in the range of energy loss of 200 eV to 210 eV indicates that chlorine is contained in the region.

From FIGS. 8 to 11, it is appreciated that the additive inside the CNTs 2 is composed of iron and chlorine. Further, as shown in FIG. 12, oxygen was not detected in the regions R1, R2, and R5, whereas in the regions R3 and R4, an oxygen peak appeared in a range surrounded by a broken line. In particular, the oxygen peak in the region R4, which is near the openings of CNTs 2, is high, indicating that a large amount of oxygen is present. Further, as shown in FIG. 13, chlorine was detected in a large amount in the order of regions R2 to R5. From FIGS. 12 and 13, it is confirmed that the additive is oxidized at the openings of the CNTs 2, specifically, at the end of the portion inside the CNT2 to which the metal compound 3 is added, and the openings of the CNTs 2 are capped by the oxide.

Figure 14:
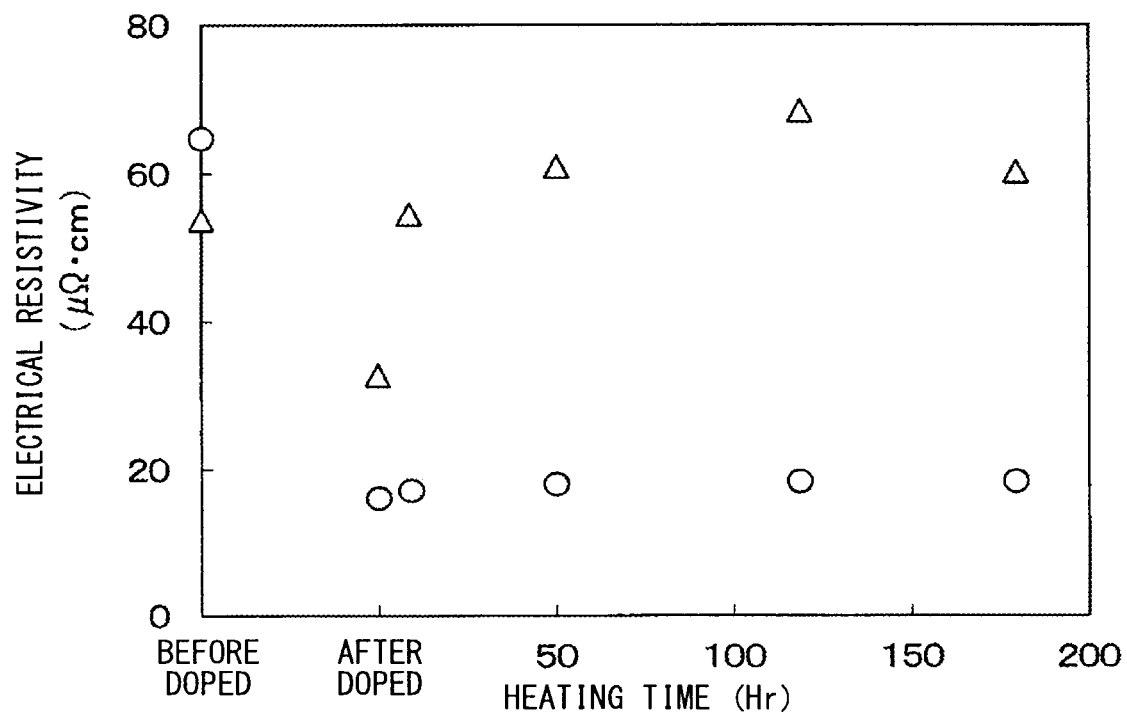
FIG. 14 is a diagram showing the relationship between heating time and electrical resistivity of a CNT aggregate to which molybdenum chloride is added.
Figure 15:
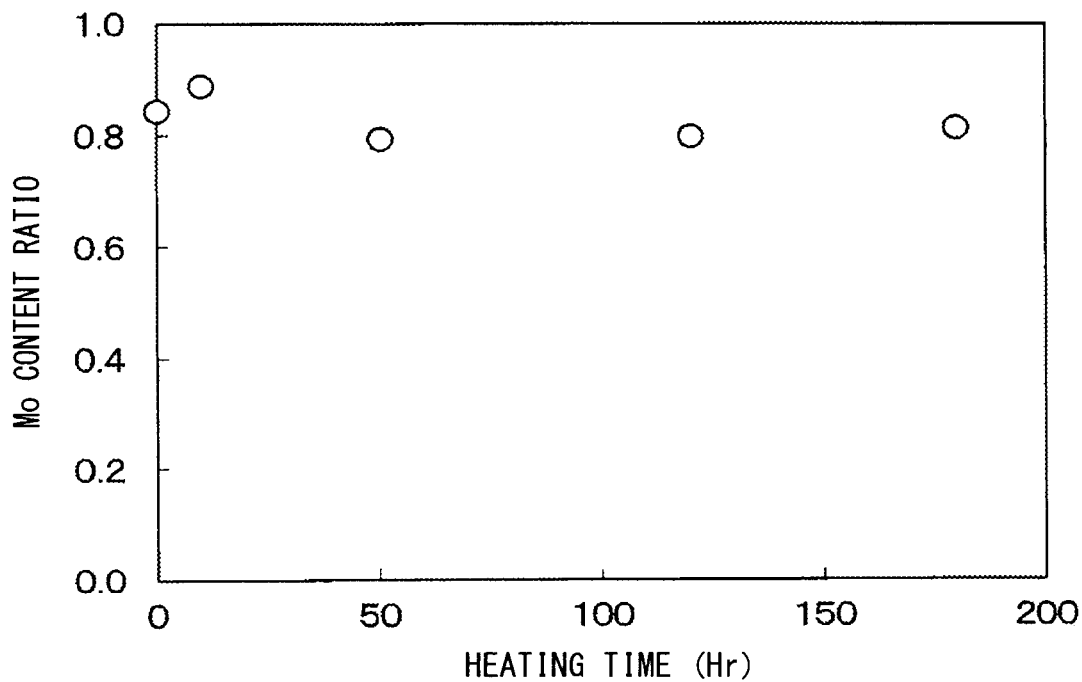
FIG. 15 is a diagram showing the relationship between heating time and the molybdenum content ratio.

FIGS. 14 and 15 are diagrams showing the results of examining the heat resistance of the CNT aggregate 1 produced by the method described above. In FIGS. 14 and 15, the horizontal axis represents a heating time when the heating test is performed at 230° C. in the atmosphere. In FIG. 14, the vertical axis represents an electrical resistivity measured by a four-terminal measurement method at room temperature after taking out the CNT aggregate 1 from the heating device. In FIG. 15, the vertical axis represents a content ratio of molybdenum. In FIG. 14, a white circle indicates the electrical resistivity of the CNT aggregate 1 in which molybdenum chloride is added to the inside of the CNTs 2 and the inter-CNT spaces between the CNTs 2, and a white triangle indicates the electrical resistivity of a CNT aggregate to which $AuCl_3$ is added to the surface thereof. Further, in FIG. 15, the content of molybdenum is measured by irradiating the CNT aggregate 1 and a $SiO_2$ substrate with X-rays while the CNT aggregate 1 is placed on the $SiO_2$ substrate. The content ratio of molybdenum is the detected amount of molybdenum when the amount of Si detected is defined as 1. The content ratio of molybdenum was measured using EDX-7000 of Shimadzu Corporation.

As shown in FIG. 14, when the CNT aggregate to which $AuCl_3$ is added to the surface is heated at 230° C., the electrical resistance increases in a short time and returns to the electrical resistance before the addition of $AuCl_3$. On the other hand, in the CNT aggregate 1 in which molybdenum chloride is added to the inside of the CNTs 2 and the inter-CNT spaces between the CNTs 2, the electrical resistance is maintained at a low level even after heated for a long time.

Figure 16:
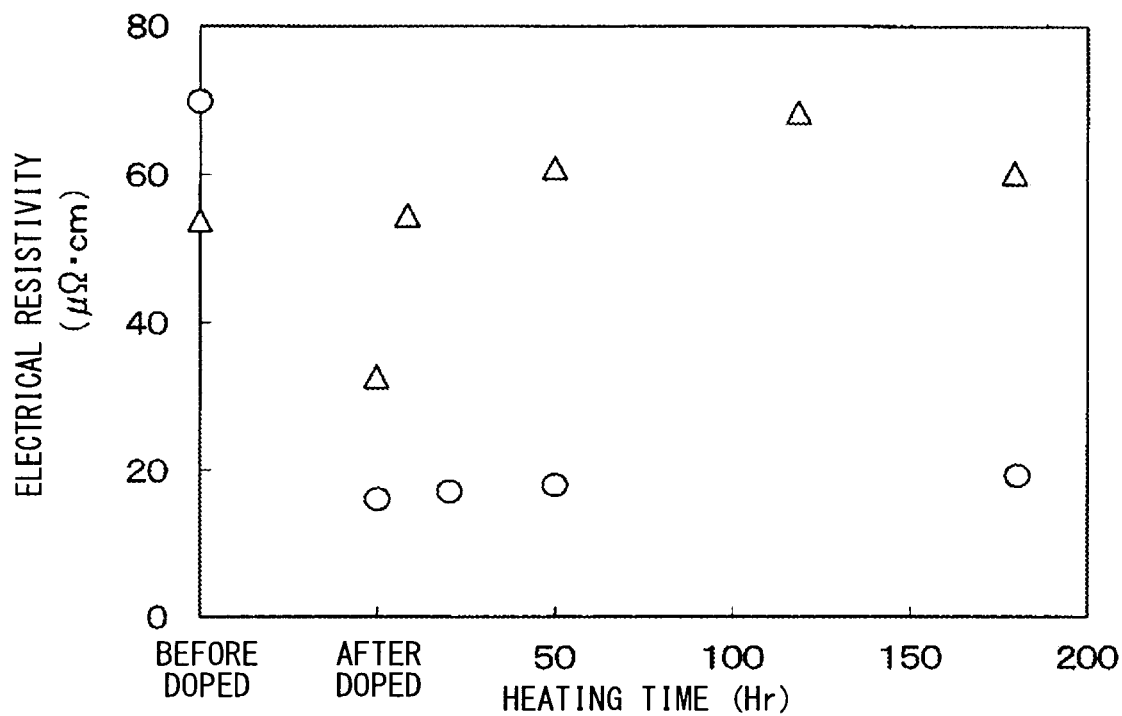
FIG. 16 is a diagram showing the relationship between heating time and electrical resistivity of a CNT aggregate to which iron chloride is added.

FIG. 16 is a graph of the electrical resistivity of the CNT aggregate 1 to which iron chloride is added. In FIG. 16, a white circle indicates the electrical resistivity of the CNT aggregate 1 in which iron chloride is added to the inside of the CNTs 2 and the inter-CNT spaces between the CNTs 2, and a white triangle indicates the electrical resistivity of the CNT aggregate in which $AuCl_3$ is added to the surface. As shown in FIG. 16, in the CNT aggregate 1 in which iron chloride is added to the inside of the CNTs 2 and the inter-CNT space between the CNTs 2, the electrical resistance is maintained low even after heated for a long time.

In the experiment conducted by the present inventors, when the $MoCl_5$ powder was heated at 230° C. in the air, it disappeared in about 3 hours. It is considered because $MoCl_5$ is changed to $MoCl_4$ having high sublimation property as shown in the following chemical formula 1. From this, it can be said that $MoCl_5$ is unstable at 230° C. in the atmosphere.

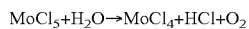   [Chemical Formula 1]

On the other hand, as shown in FIG. 15, the amount of molybdenum contained in the CNT aggregate 1 hardly changes even when heated at 230° C. As such, it is appreciated that the molybdenum chloride added to the CNT aggregate 1 is retained without being dispersed, and the molybdenum chloride in the CNT aggregate 1 is stable at 230° C.

In the present embodiment, as described above, the electrical resistance of the CNT aggregate 1 is lowered as the metal compound 3 is added to the inside of the CNTs 2 and the inter-CNT spaces defined between the CNTs 2. Further, since the openings of the CNTs 2 and the openings of the inter-CNT spaces are capped with the oxide 4 of the metal compound 3, the metal compound 3 inside the CNTs 2 and in the inter-CNT spaces between the CNTs 2 is shielded from the air. As a result, the heat resistance is improved as compared with the conventional product, and the heat resistance of 200° C. or higher can be achieved.

The above-described characteristics can also be confirmed in a doping test in which the CNT film is doped with $FeCl_3$. In this case, as the CNT film, GALVORN CNT TAPE manufactured by DexMat INC. (USA) was used. The initial resistance of the CNT film was 33.8±6.9 μΩcm. When this CNT film was subjected to a heat treatment at 350° C. for 1 hour in the air, the initial resistance after the heat treatment was 61.2±8.4 μΩcm. Further, the following three types of samples, C-1, C-2, and C-3, were prepared, in which the sample C-1 was a CNT film after the heat treatment and the samples C-2 and C-3 were the CNT films further subjected to a doping treatment after the heat treatment. Specifically, the sample C-1 was a CNT film subjected to the heat treatment only, the sample C-2 was a CNT film doped with IBr after the heat treatment, and the sample C-3 was a CNT film doped with $FeCl_3$ after the heat treatment. In the sample C-3, 99.9% pure anhydrous $FeCl_3$ made by Sigma Aldrich was used without purification and added as a dopant. In the sample C-2, 98% pure IBr made by Sigma Aldrich was used without purification and added as a dopant. In the doping treatment, the CNT film and the dopant were both placed in a closed container filled with an inert gas, and the treatment was carried out at 270° C. for 24 hours. After the doping treatment, the CNT film was washed with ethanol several times to remove excess dopant adsorbed on its surface.

Figure 17:
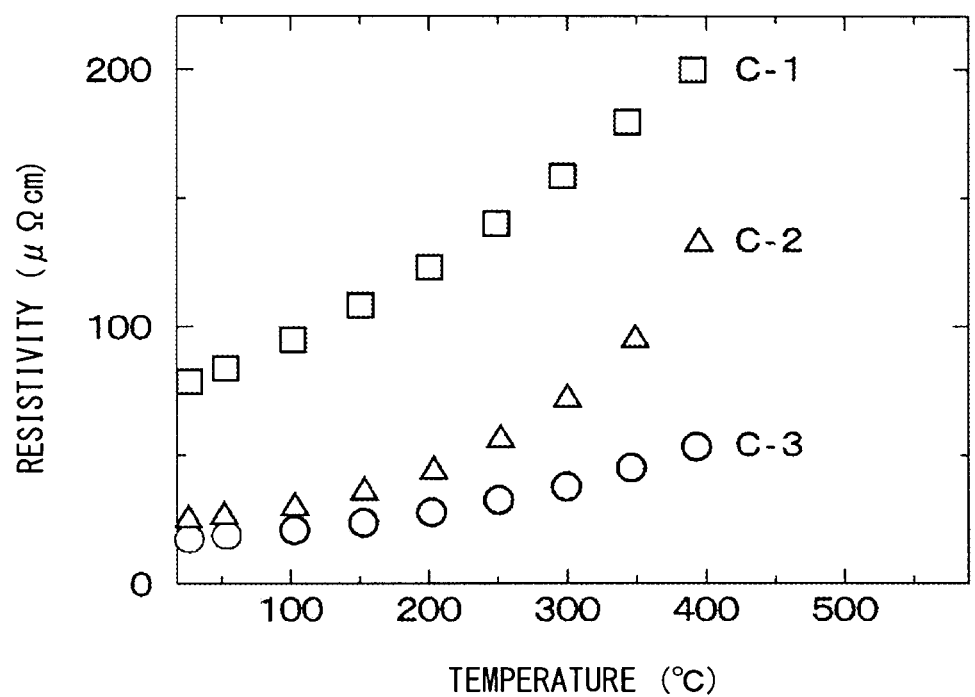
FIG. 17 is a diagram showing the temperature dependence of electrical resistivity of samples C-1 to C-3.

Then, in order to investigate the temperature dependence on the electrical resistivity, the electrical resistivity of each of the samples C-1 to C-3 under an inert gas atmosphere were measured. The electrical resistivity was measured at a rate in which the temperature was increased by 25° C. per minute. FIG. 17 shows the measurement results. As shown FIG. 17, the electrical resistivity of all three types of the samples C-1 to C-3 was increased by the heating from the room temperature. In particular, the rate of increase in the electrical resistivity of the sample C-3 with the increase in the temperature was lower than that of the sample C-2, and the rate of change was also small.

As described above, in a case where the surface of the CNT aggregate 1 is covered with the oxide film of the metal compound 3, the metal compound 3 is shielded from the air, so that the heat resistance is further improved.

This improvement was confirmed by analyzing the characteristics of the doped CNT film. In the analysis, a Raman spectroscopic analysis (hereinafter referred to as Raman), an X-ray photoelectron spectroscopic analysis (hereinafter referred to as XPS) and a thermogravimetric/differential thermal analysis (hereinafter referred to as TG-DTA) were performed. In the Raman, an excitation wavelength of 532 nm was used, and a confocal Raman microscope, InVia Qontor made by Renishaw (UK) was used. In the XPS, PHI 5000 VersaProve II made by ULVAC-PHI, Inc. (JAPAN) was used, X-rays were focused on a spot size having a diameter of 200 μm on the sample under 50 W. As an X-ray source, Al—Kα ray (hv=1486.6 eV) was used. In the TG-DTA performed for the evaluation of the thermal stability of each sample, TG-DTA 6300 made by Hitachi High-Technologies Corporation (JAPAN) was used. In the TG-DTA, the measurement temperature range was 40° C. to 1000° C., and under the condition that the scanning speed was increased by +10.0° C. per minute, the air was introduced at 100 mL per minute using an alumina pan.

Figure 18A:
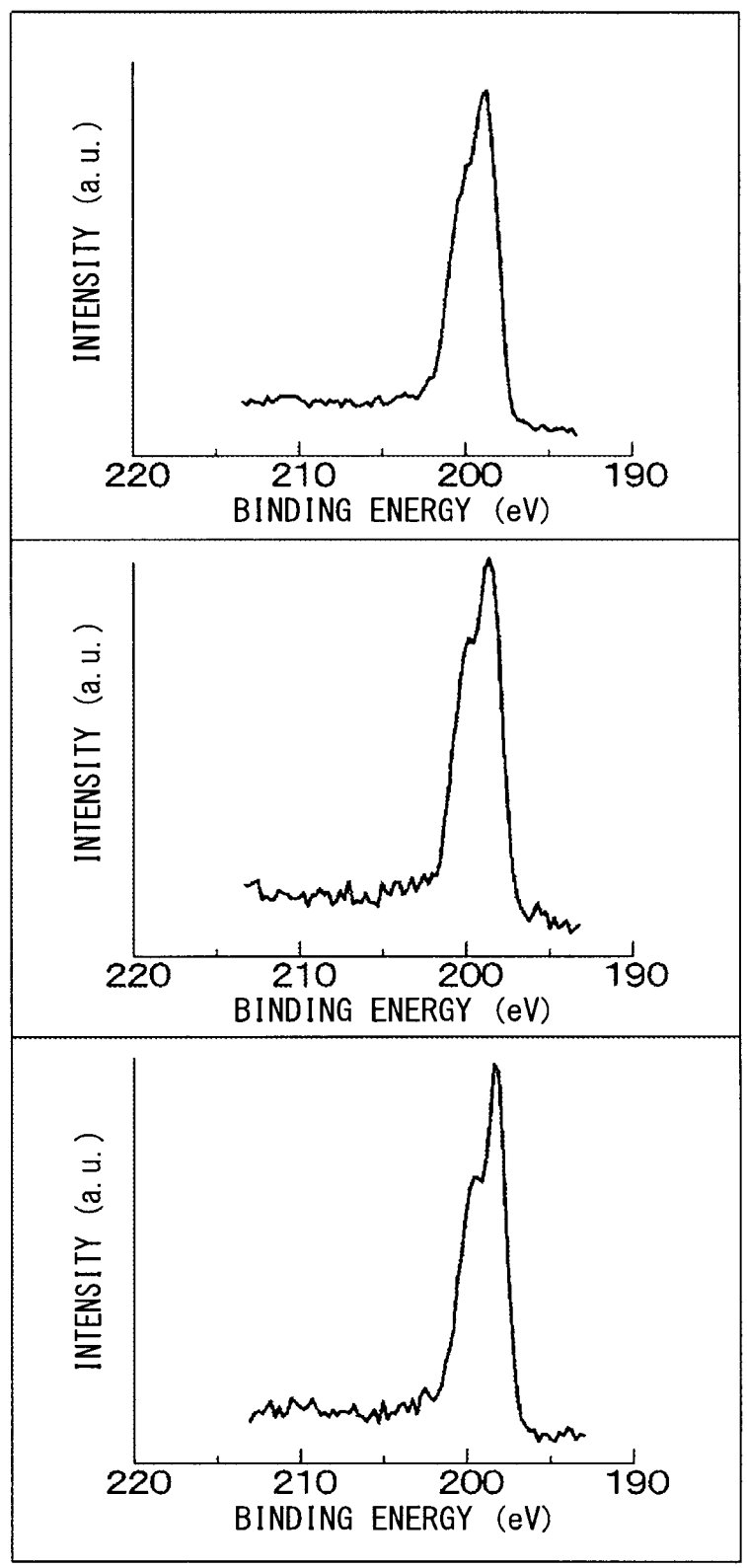
FIG. 18A is a diagram showing the intensity of an X-ray photoelectron spectroscopic analysis (XPS) spectrum with respect to the binding energy of a Cl 2p region in the sample C-3.
Figure 18B:
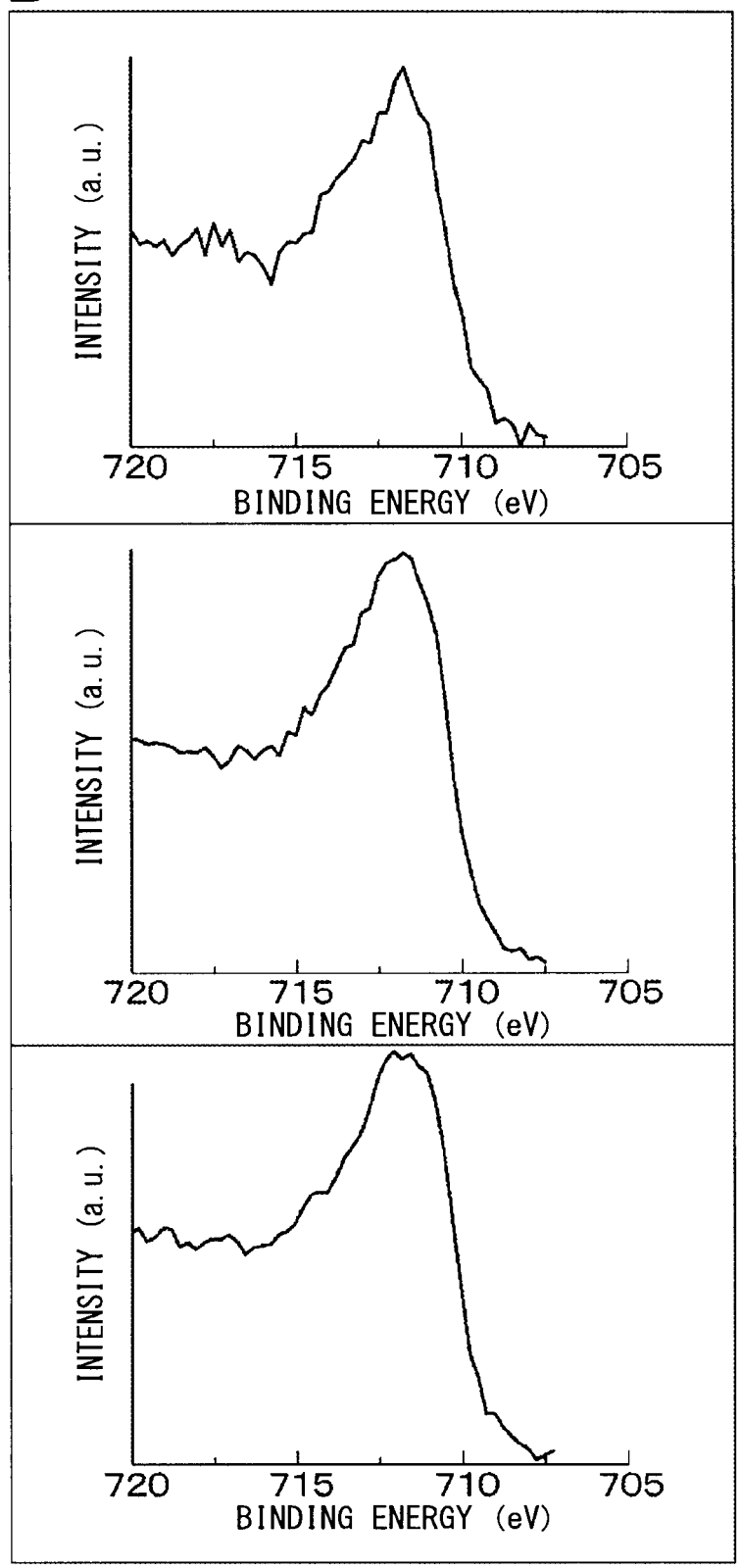
FIG. 18B is a diagram showing the intensity of the XPS spectrum with respect to the binding energy of a Fe 2p region in the sample C-3.

In the XPS measurement, in order to detect Fe and Cl inside the CNT doped with $FeCl_3$, attention was paid to the peaks in the Fe 2p region near 712 eV and the Cl 2p region near 198 eV. FIGS. 18A and 18B show the relationship between the binding energy (eV) and the intensity (a.u.) of the XSP spectrum, respectively, in the Cl 2p region near 198 eV of the sample C-3 and the Fe 2p region near 712 eV of the sample C-3. In each of FIGS. 18A and 18B, the top spectrum shows the result before heating, the middle spectrum shows the result after heating for 50 hours, and the bottom spectrum shows the result after heating for 120 hours.

As can be seen from FIGS. 18A and 18B, in the XPS spectrum of the sample C-3, peak disappearance and peak shape change were not observed in the region of interest before the heating and after the heating. Therefore, it can be said that $FeCl_3$ is retained in the CNT even at a high temperature of about 220° C., which is assumed when the CNT aggregate 1 is applied to a motor or the like.

Figures 19, 20:
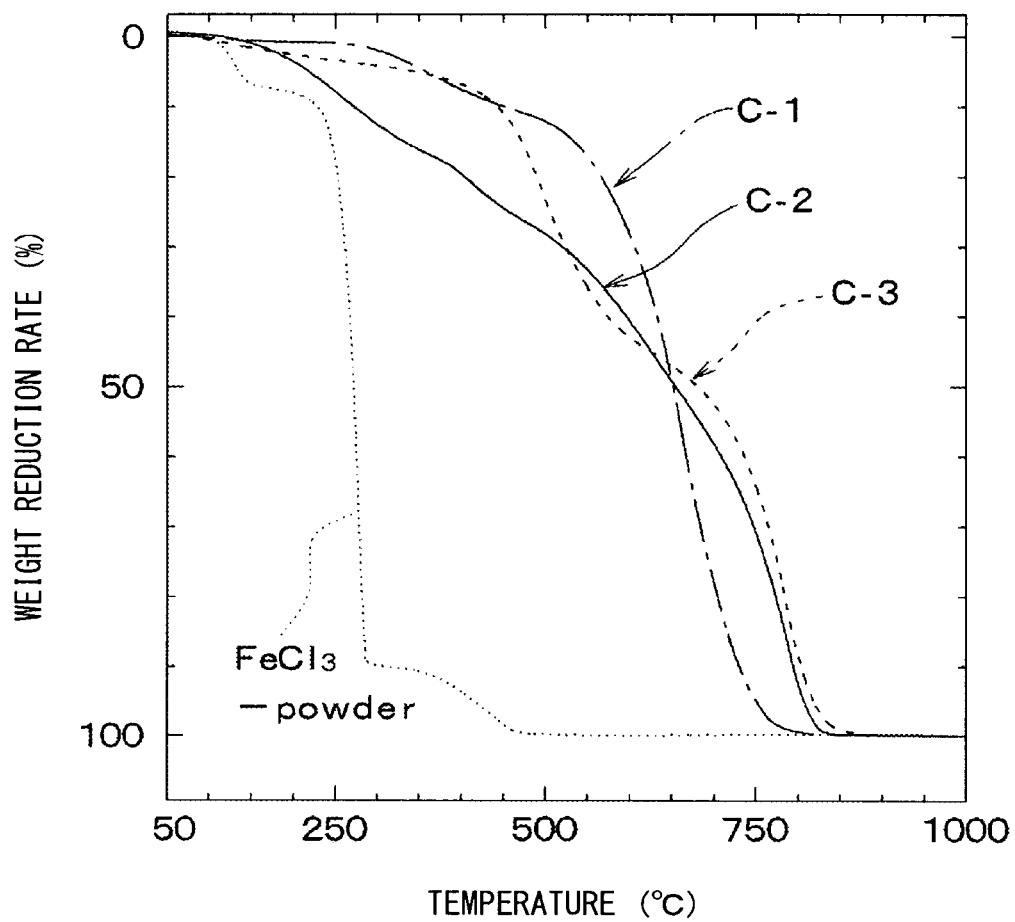
FIG. 19 is a diagram showing the measurement results of G band peak positions of the samples C-1 to C-3 in a Raman spectrum.
FIG. 20 is a diagram showing the results of thermogravimetric/differential thermal analysis (TG-DTA) in the samples C-1 to C-3 and $FeCl_3$ powder.

Also, the shift of the G band peak position in the Raman spectrum reflects the state of p-type doping in the CNT. FIG. 19 shows the results of measurement of the G band peak position of the Raman spectrum using excitation light having an excitation wavelength of 532 nm in the samples C-1 to C-3. A high-temperature standing test was performed on each sample, and the G band peak positions before and after the heat treatment in the high-temperature leaving test were measured. However, the sample C-1 was an undoped sample and was considered to have no change in the G band peak positions before and after the heat treatment. Therefore, only the measurement result before the heat treatment is shown for the sample C-1.

In the results of the high temperature standing test, the G band peak positions of the samples C-2 and C-3 before the heat treatment were 1601 $cm^{-1}$ and 1609 $cm^{-1}$, respectively. Thus, as compared with the peak position 1593 $cm^{-1}$ of the sample C-1, the peak shifts of the sample C-2 and C-3 are large, in proportion to the change in resistivity. On the other hand, in the results of the samples C-2 and C-3 after the heat treatment, the G band peak position of the sample C-2 was 1596 $m^{-1}$, whereas the G band position of the sample C-3 did not change before and after the heat treatment. This suggests that, in the sample C-3, the p-type doping state is retained before and after the heat treatment.

In the TG-DTA, the analysis was performed on the samples C-1 to C-3 and $FeCl_3$ powders. As a result, $FeCl_3$ showed different thermal stability with and without doping, as shown in FIG. 20. That is, it was confirmed that the thermogravimetric analysis (TG) of the $FeCl_3$ powder alone shows a weight reduction from around 200° C., while the sample C-3 shows a rapid weight reduction from around 500° C. and from around 700° C. In the sample C-3, since the rapid weight reduction and the gradient in the temperature range around 500° C. and around 700° C. were substantially the same as those of the sample C-1, it can be inferred that the weight reduction is due to the weight reduction of the CNT itself. In the $FeCl_3$ powder alone, it can be inferred that the weight reduction is due to the weight reduction of the $FeCl_3$ itself. Accordingly, it is considered that $FeCl_3$ contained in the CNT and the CNT are thermally stable, relative to the simple substance. This feature was also confirmed in the sample C-2, and it can be said that it supports the result of improvement in thermal stability due to inclusion of another substance.

Since the metal compound 3 in the inter-CNT spaces is protected by the oxide 4 and the CNTs 2, the heat resistance increases with the increase in density of the CNTs 2. Specifically, the density of CNTs 2 is, for example, 0.1 $g/cm^3$ or more, preferably 0.6 $g/cm^3$ or more, and more preferably 0.8 $g/cm^3$ or more.

Other Embodiments

The present disclosure is not limited to the embodiment described above, but can be appropriately modified in various other ways.

For example, in the embodiment described above, the cases where $MoCl_5$ and $FeCl_3$ are added as the metal compound 3 to the CNT aggregate 1 have been described. Alternatively, other metal chloride may be added, or a metal compound other than the metal chloride may be added.

Figure 21:
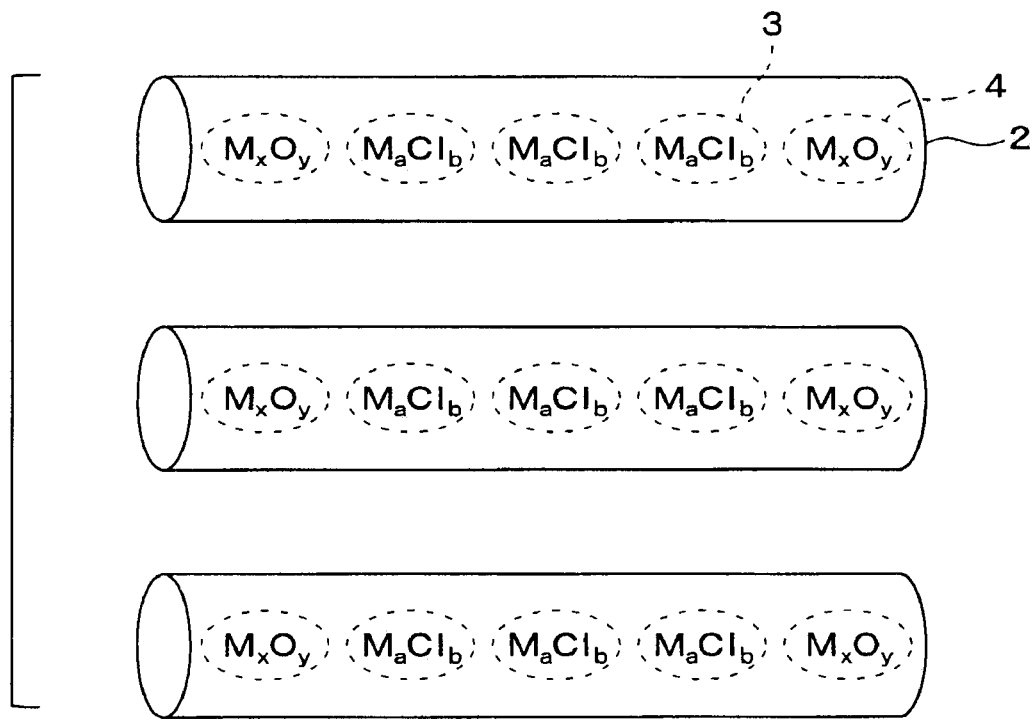
FIG. 21 is a diagram showing an internal configuration of a CNT aggregate according to another embodiment.
Figure 22:
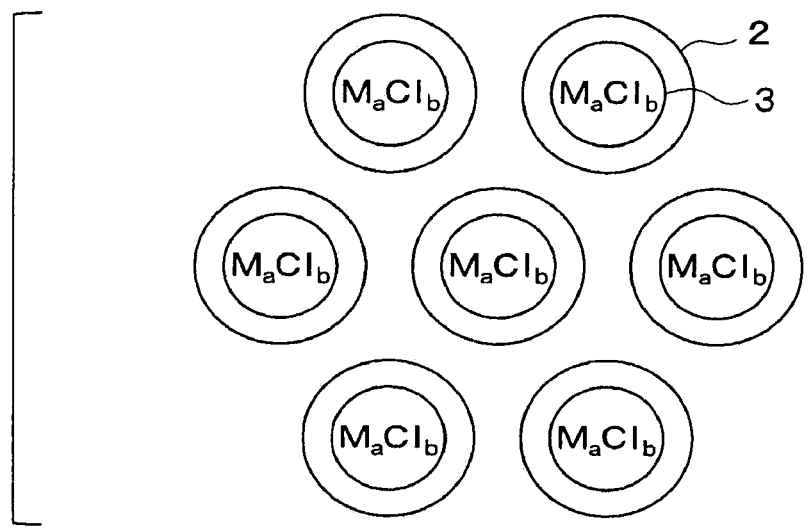
FIG. 22 is a diagram showing an internal configuration of a CNT aggregate according to another embodiment.

In the embodiment described above, the metal compound 3 is added to the space inside the CNTs 2 and the inter-CNT spaces between the CNTs 2. Alternatively, as shown in FIGS. 21 and 22, the metal compound 3 may be added only to the space inside the CNTs 2. Also in this case, as in the first embodiment described above, the openings of the CNTs 2 are capped with the oxide 4 of the metal compound 3, and the metal compound 3 inside the CNT aggregate 1 is shielded from the atmosphere. Thus, the heat resistance is improved as compared with the conventional product, and the heat resistance of 200° C. or higher can be achieved.

Figure 23:
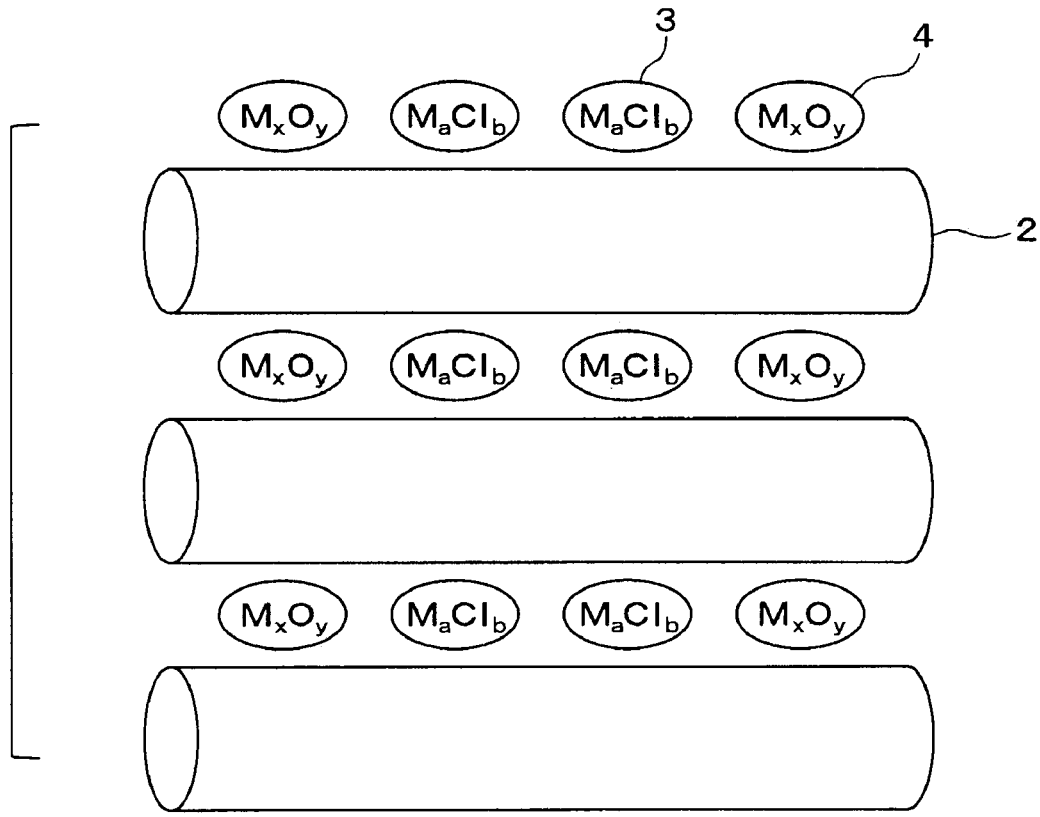
FIG. 23 is a diagram showing an internal configuration of a CNT aggregate according to another embodiment.
Figure 24:
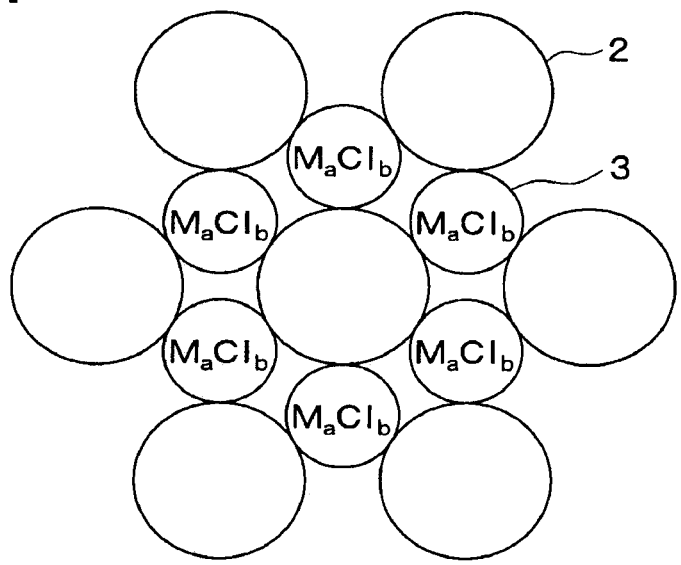
FIG. 24 is a diagram showing an internal configuration of a CNT aggregate according to another embodiment.
Figure 25:
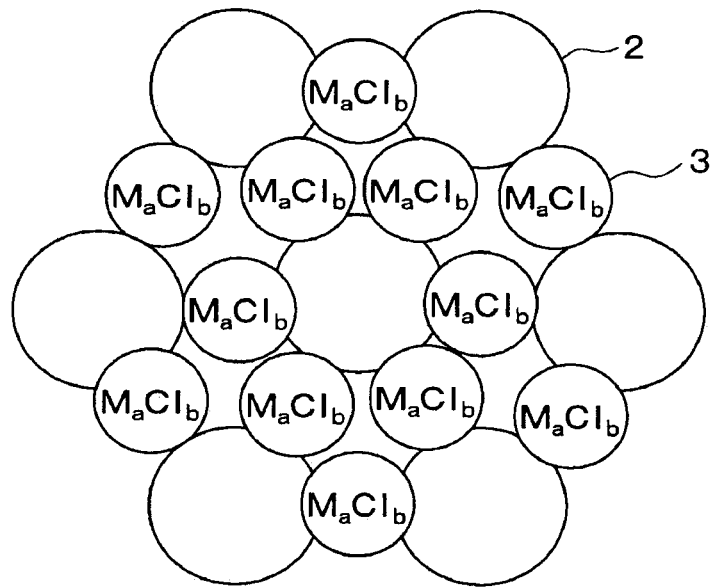
FIG. 25 is a diagram showing an internal configuration of a CNT aggregate according to another embodiment.
Figure 26:
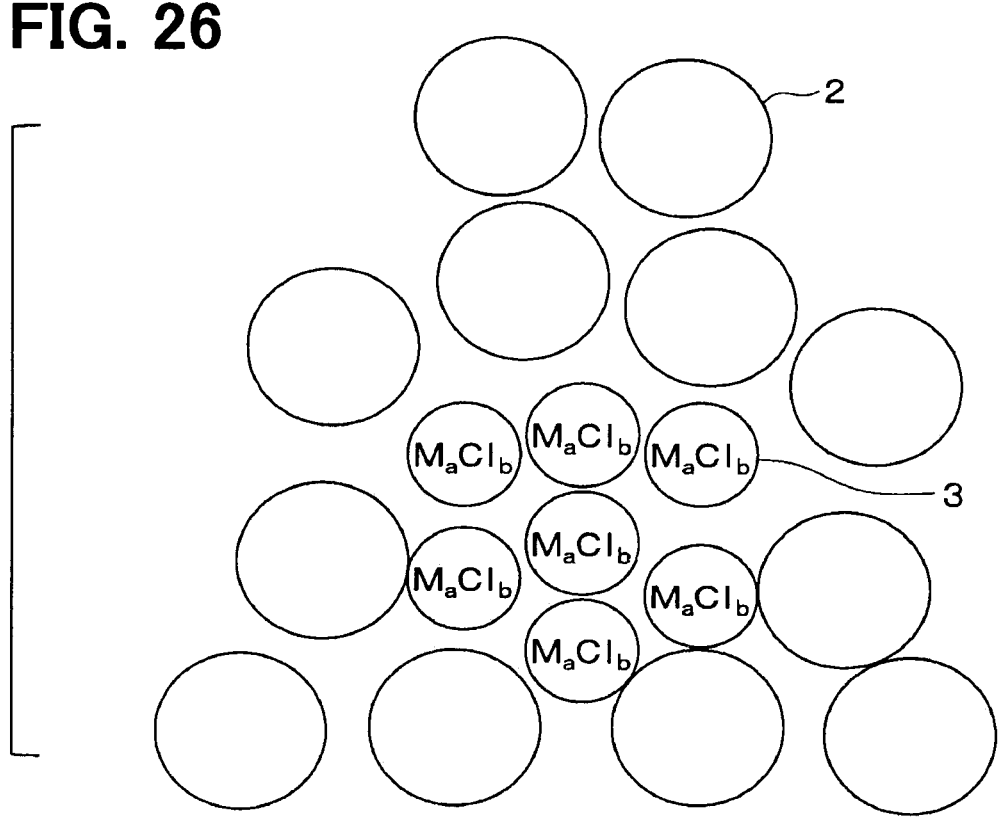
FIG. 26 is a diagram showing an internal configuration of a CNT aggregate according to another embodiment.

Further, as shown in FIGS. 23 to 25, the metal compound 3 may be added only to the inter-CNT spaces defined between the CNTs 2. Also in this case, as in the first embodiment described above, the openings of the inter-CNT spaces are capped with the oxide 4 of the metal compound 3, and the metal compound 3 inside the CNT aggregate 1 is thus shielded from the atmosphere. As such, the heat resistance is improved as compared with the conventional product, and the heat resistance of 200° C. or higher can be achieved. Further, as shown in FIG. 26, the metal compound 3 may be added to the space surrounded by the bundles of the plurality of CNTs 2.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A carbon nanotube aggregate comprising:
   a plurality of carbon nanotubes;
   a metal compound; and
   a metal oxide including a metal of the metal compound, wherein
   the metal compound is contained in a space inside of each of the carbon nanotubes and in a space defined between the plurality of carbon nanotubes, and
   the metal oxide is disposed at openings defined at both ends of the space containing the metal compound inside of each of the carbon nanotubes and at openings defined at both ends of the space containing the metal compound between the plurality of carbon nanotubes to cap the ends of the spaces in a longitudinal direction of the plurality of carbon nanotubes.

2. The carbon nanotube aggregate according to claim 1, wherein the metal compound is made of a metal chloride.

3. The carbon nanotube aggregate according to claim 2, wherein the metal chloride is molybdenum chloride, and wherein the metal oxide is an oxide of molybdenum chloride or a partial oxide of molybdenum chloride.

4. The carbon nanotube aggregate according to claim 2, wherein the metal chloride is iron chloride, and wherein the metal oxide is an oxide of iron chloride or a partial oxide of iron chloride.

5. A carbon nanotube aggregate comprising:
a plurality of carbon nanotubes;
a metal compound; and
a metal oxide including a metal of the metal compound,
wherein the metal compound is contained in a space inside of each of the carbon nanotubes and/or in a space defined between the plurality of carbon nanotubes, and
wherein the carbon nanotube aggregate has a quadrangular pillar shape in which a length of one side is 10 µm or more or a columnar shape having a diameter of 10 µm or more.

6. A carbon nanotube aggregate comprising:
a plurality of carbon nanotubes;
a metal compound; and
a metal oxide including a metal of the metal compound,
wherein the metal compound is contained in a space inside of each of the carbon nanotubes and/or in a space defined between the plurality of carbon nanotubes, and
wherein a density of the plurality of carbon nanotubes is 0.8 g/cm3 or more.

* * * * *